United States Patent
Ekdahl et al.

(10) Patent No.: US 6,745,732 B2
(45) Date of Patent: Jun. 8, 2004

(54) VCT CAM TIMING SYSTEM UTILIZING CALCULATION OF INTAKE PHASE FOR DUAL DEPENDENT CAMS

(75) Inventors: Earl Ekdahl, Ithaca, NY (US); Stanley B. Quinn, Jr., Elmhurst, IL (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/303,575

(22) Filed: Nov. 25, 2002

(65) Prior Publication Data

US 2003/0230263 A1 Dec. 18, 2003

(51) Int. Cl.$^7$ .................................................. F01L 1/34
(52) U.S. Cl. ................................ 123/90.15; 123/90.17; 74/568 R
(58) Field of Search ..................... 123/90.15, 90.16, 123/90.17; 74/568 R; 464/1, 2, 160

(56) References Cited

U.S. PATENT DOCUMENTS

| | | | |
|---|---|---|---|
| 4,442,813 A | 4/1984 | Nagase et al. ............... 123/418 |
| 5,002,023 A | 3/1991 | Butterfield et al. ......... 123/90.15 |
| 5,107,804 A | 4/1992 | Becker et al. ............. 123/90.17 |
| 5,172,659 A | 12/1992 | Butterfield et al. ......... 123/90.17 |
| 5,184,578 A | 2/1993 | Quinn, Jr. et al. ......... 123/90.17 |
| 5,209,202 A | * 5/1993 | Maurer et al. ........... 123/406.18 |
| 5,245,968 A | * 9/1993 | Kolias et al. ................ 123/480 |
| 5,289,805 A | 3/1994 | Quinn, Jr. et al. ......... 123/90.17 |
| 5,361,735 A | 11/1994 | Butterfield et al. ......... 123/90.17 |
| 5,497,738 A | 3/1996 | Siemon et al. ........... 123/90.17 |
| 6,474,278 B1 | * 11/2002 | Davis et al. .............. 123/90.15 |

FOREIGN PATENT DOCUMENTS

| | | | |
|---|---|---|---|
| JP | 10196420 | 7/1998 | ........... F02D/13/02 |
| JP | 10196422 | 7/1998 | ........... F02D/13/02 |
| JP | 10266876 | 10/1998 | ........... F02D/13/02 |
| JP | 2003155939 | 5/2003 | ........... F02D/13/02 |

* cited by examiner

Primary Examiner—Thomas Denion
Assistant Examiner—Jaime Corrigan
(74) Attorney, Agent, or Firm—Brown & Michaels, PC; Greg Dziegielewski

(57) ABSTRACT

An engine with dependent intake cams requires a different method and formula to determine the phase of the intake cams. The exhaust camshaft drives the intake camshaft and so the intake cam position is dependent upon the exhaust cam position. The present invention provides a VCT cam timing system utilizing calculation of intake phase for dual dependent cams.

7 Claims, 3 Drawing Sheets

VCT CAM TIMING SYSTEM UTILIZING CALCULATION OF INTAKE PHASE FOR DUAL DEPENDENT CAMS

REFERENCE TO RELATED APPLICATIONS

This application claims an invention which was disclosed in Provisional Application No. 60/389,200, filed Jun. 17, 2002, entitled "VCT CAM TIMING SYSTEM UTILIZING CALCULATION OF INTAKE PHASE FOR DUAL DEPENDENT CAMS". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of variable camshaft timing (VCT) systems. More particularly, the invention pertains to calculation and formula of the intake phase for dual dependent cams.

2. Description of Related Art

Internal combustion engines have become increasingly complex, as features such as variable cam timing (VCT) and active noise cancellation are included. For example, using VCT, the angular displacement, or phase of a camshaft, relative to the crankshaft to which it is drivably connected, is dynamically altered to bring about changes in engine characteristics, such as fuel economy or power. Typically, there is a feedback loop in which the desired values of such engine characteristics are measured against their existing values, and changes are effected inside the engine in response to discrepancies. To accomplish this, modern automobiles usually have a control module (or more than one) having a microcomputer that constantly analyzes data fed into it from various parts of the engine and other parts of the automobile and ambient conditions (exhaust gas sensors, pressure and temperature sensors, etc.) and emits signals in response to such data. For example, in regard to VCT, as changes occur in engine and external conditions, the angular displacement between the cam shaft and the crank shaft that drives it is altered.

The performance of an internal combustion engine can be improved by the use of dual camshafts, one to operate the intake valves of the various cylinders of the engine and the other to operate the exhaust valves. Typically, one of such camshafts is driven by the crankshaft of the engine, through a sprocket and chain drive or a belt drive, and the other of such camshafts is driven by the first, through a second sprocket and chain drive or a second belt drive. Alternatively, both of the camshafts can be driven by a single crankshaft powered chain drive or belt drive.

Engine performance in an engine with dual camshafts can be further improved, in terms of idle quality, fuel economy, reduced emissions or increased torque, by changing the positional relationship of one of the camshafts, usually the camshaft which operates the intake valves of the engine, relative to the other camshaft and relative to the crankshaft, to thereby vary the timing of the engine in terms of the operation of intake valves relative to its exhaust valves or in terms of the operation of its valves relative to the position of the crankshaft.

Consideration of information disclosed by the following U.S. patents, which are all hereby incorporated by reference, is useful when exploring the background of the present invention.

U.S. Pat. No. 5,002,023 describes a VCT system within the field of the invention in which the system hydraulics includes a pair of oppositely acting hydraulic cylinders with appropriate hydraulic flow elements to selectively transfer hydraulic fluid from one of the cylinders to the other, or vice versa, to thereby advance or retard the circumferential position on of a camshaft relative to a crankshaft. The control system utilizes a control valve in which the exhaustion of hydraulic fluid from one or another of the oppositely acting cylinders is permitted by moving a spool within the valve one way or another from its centered or null position. The movement of the spool occurs in response to an increase or decrease in control hydraulic pressure, $P_C$, on one end of the spool and the relationship between the hydraulic force on such end and an oppositely direct mechanical force on the other end which results from a compression spring that acts thereon.

U.S. Pat. No. 5,107,804 describes an alternate type of VCT system within the field of the invention in which the system hydraulics include a vane having lobes within an enclosed housing which replace the oppositely acting cylinders disclosed by the aforementioned U.S. Pat. No. 5,002,023. The vane is oscillatable with respect to the housing, with appropriate hydraulic flow elements to transfer hydraulic fluid within the housing from one side of a lobe to the other, or vice versa, to thereby oscillate the vane with respect to the housing in one direction or the other, an action which is effective to advance or retard the position of the camshaft relative to the crankshaft. The control system of this VCT system is identical to that divulged in U.S. Pat. No. 5,002,023, using the same type of spool valve responding to the same type of forces acting thereon.

U.S. Pat. Nos. 5,172,659 and 5,184,578 both address the problems of the aforementioned types of VCT systems created by the attempt to balance the hydraulic force exerted against one end of the spool and the mechanical force exerted against the other end. The improved control system disclosed in both U.S. Pat. Nos. 5,172,659 and 5,184,578 utilizes hydraulic force on both ends of the spool. The hydraulic force on one end results from the directly applied hydraulic fluid from the engine oil gallery at full hydraulic pressure, $P_S$. The hydraulic force on the other end of the spool results from a hydraulic cylinder or other force multiplier, which acts thereon in response to system hydraulic fluid at reduced pressure, $P_C$, from a PWM solenoid. Because the force at each of the opposed ends of the spool is hydraulic in origin, based on the same hydraulic fluid, changes in pressure or viscosity of the hydraulic fluid will be self-negating, and will not affect the centered or null position of the spool.

U.S. Pat. No. 5,289,805 provides an improved VCT method which utilizes a hydraulic PWM spool position control and an advanced control algorithm that yields a prescribed set point tracking behavior with a high degree of robustness.

In U.S. Pat. No. 5,361,735, a camshaft has a vane secured to an end for non-oscillating rotation. The camshaft also carries a timing belt driven pulley which can rotate with the camshaft but which is oscillatable with respect to the camshaft. The vane has opposed lobes which are received in opposed recesses, respectively, of the pulley. The camshaft tends to change in reaction to torque pulses which it experiences during its normal operation and it is permitted to advance or retard by selectively blocking or permitting the flow of engine oil from the recesses by controlling the position of a spool within a valve body of a control valve in response to a signal from an engine control unit. The spool is urged in a given direction by rotary linear motion translating means which is rotated by an electric motor, preferably of the stepper motor type.

U.S. Pat. No. 5,497,738 shows a control system which eliminates the hydraulic force on one end of a spool resulting from directly applied hydraulic fluid from the engine oil gallery at full hydraulic pressure, $P_S$, utilized by previous embodiments of the VCT system. The force on the other end of the vented spool results from an electromechanical actuator, preferably of the variable force solenoid type, which acts directly upon the vented spool in response to an electronic signal issued from an engine control unit ("ECU") which monitors various engine parameters. The ECU receives signals from sensors corresponding to camshaft and crankshaft positions and utilizes this information to calculate a relative phase angle. A closed-loop feedback system which corrects for any phase angle error is preferably employed. The use of a variable force solenoid solves the problem of sluggish dynamic response. Such a device can be designed to be as fast as the mechanical response of the spool valve, and certainly much faster than the conventional (fully hydraulic) differential pressure control system. The faster response allows the use of increased closed-loop gain, making the system less sensitive to component tolerances and operating environment.

In a V configuration engine with dependent intake cams, the known method to determine the phase of the intake cams is insufficient for the VCT system. Because the exhaust camshaft drives the intake camshaft and so the intake cam position is dependent upon the exhaust cam position. Therefore, it is desirous to provide a VCT cam timing system utilizing calculation of intake phase for dual dependent cams and relating to the same with new parameters defined.

SUMMARY OF THE INVENTION

The present invention provides a VCT cam timing system utilizing calculation of intake phase for dual dependent cams.

The present invention provides a novel formula of intake phase, wherein new parameters are defined and used.

Accordingly a variable cam timing (VCT) system used in an internal combustion engine is provided. The system has a dual dependent cam shaft configuration, wherein an intake cam position is referenced to an exhaust cam. The system includes a plurality of sensed signals. The plurality of sensed signals are: a sequence of crank tooth signals generated by a first position sensor; a sequence of exhaust cam tooth signals generated by a second position sensor; and a sequence of intake cam tooth signals generated by a third position sensor. The system further includes an formula of intake phase degrees referenced to the exhaust cam phase, said formula being:

$$\text{Phase}=(\Delta T/T*\text{Crank Angle})-\text{Zphase}$$

wherein $\Delta T$ is the time segment starting from a falling edge of said exhaust cam tooth signal to the next occurring falling edge of said intake cam tooth signal.

A method that provides the above elements is also provided.

DETAILED DESCRIPTION OF THE INVENTION

In a V configuration engine with dependent intake cams, a different method to determine the phase of the intake cams is provided. In the dependent intake cam layout, the exhaust camshaft drives the intake camshaft and so the intake cam position is dependent upon the exhaust cam position.

For comparison purposes, the known calculation of phase measurement for exhaust or intake cams for any of the non-dependent camshaft drive is as follows:

$$\text{Phase}=(\Delta T/T*\text{Crank Angle})-\text{Zphase}$$

Where:

Phase is in degrees referenced to crank $\Delta T$ is the time from a falling edge crank tooth signal to the next occurring falling edge cam tooth signal, the time measured in microseconds or fractional microseconds.

T is the time between 2 applicable consecutive crank teeth falling edge signals, the time measured in microseconds or fractional microseconds. T is always greater than $\Delta T$.

Crank Angle=360/number of applicable evenly spaced crank teeth, examples are:
For 2 crank teeth, Crank Angle=180 degrees
For 3 crank teeth, Crank Angle=120 degrees
For 4 crank teeth, Crank Angle=90 degrees Zphase is a run time calculated offset value, determined under controlled conditions to insure that mathematically the cam tooth falling edge signals occur within a small degree amount after the crank tooth falling edge signal and within the window provided by the 1st and 2nd edges of the crank.

The phase measurement for the intake cams of a dual dependent V engine is similar but different. Because the intake cam position is dependent on the exhaust cam position, the intake cam position is referenced to the exhaust cam.

$$\text{Phase}=(\Delta T/T*\text{Crank Angle})-\text{Zphase}$$

Where:

Phase is the intake cam phase in degrees referenced to the exhaust cam phase.

$\Delta T$ is the time from a falling edge exhaust cam tooth signal to the next occurring falling edge intake cam tooth signal, the time measured in microseconds or fractional microseconds.

T is the same as above.

Crank Angle is the same as above.

Zphase is a run time calculated offset value. Determined under controlled conditions to insure that mathematically the intake cam tooth falling edge signal occurs a small degree amount, (2.5° in this case) after the exhaust tooth falling edge signal and within the window provided by the 1st and 2nd edges of the exhaust cam signals.

Figure 1:
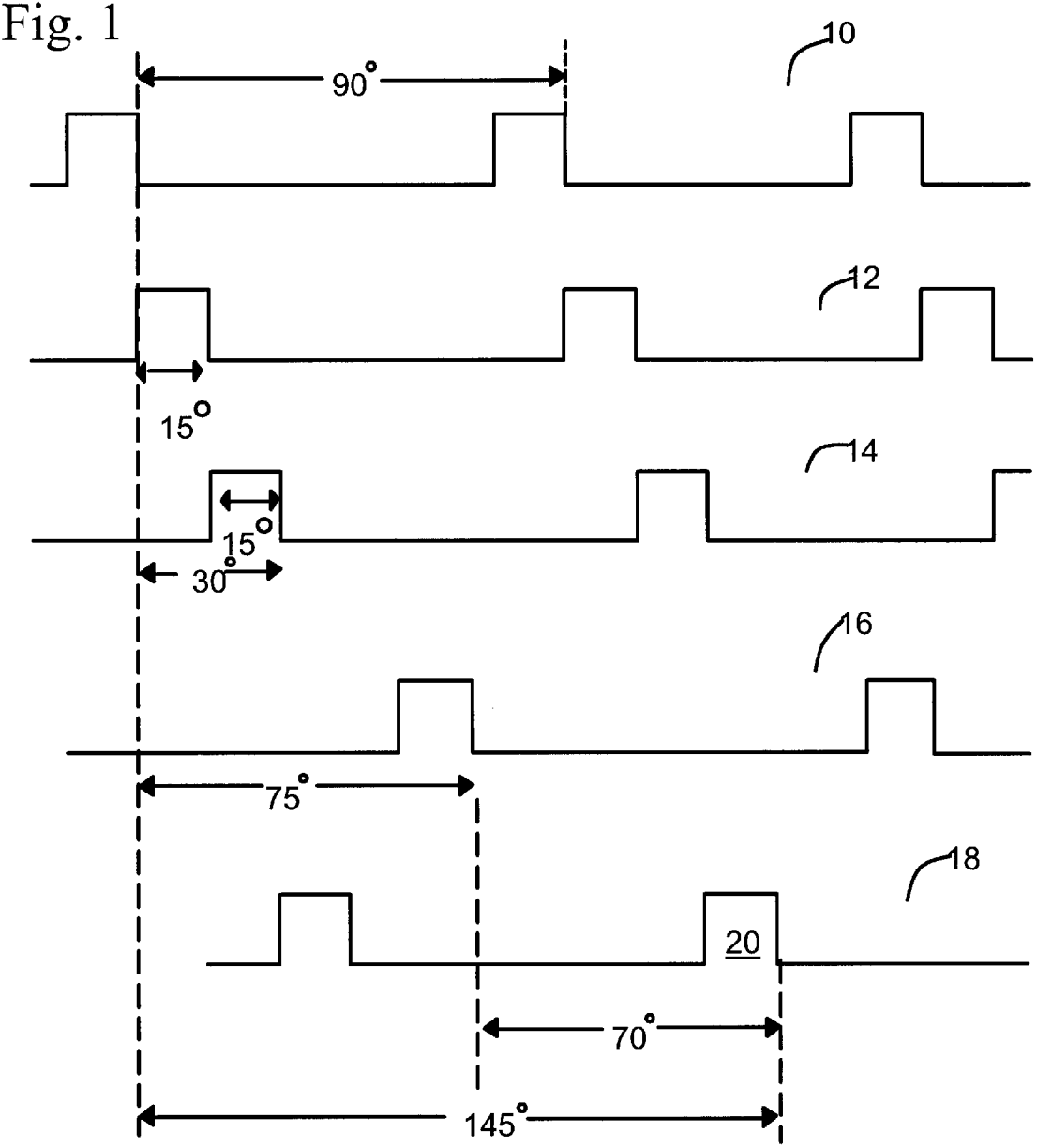
FIG. 1 shows a timing diagram for a dual dependent VCT of the present invention.

FIG. 1 shows an example of the relationships between tooth waveforms applicable to the present invention. The relationship is different in that intake cam is dependent both upon the exhaust cam and the crank shafts.

Referring to FIG. 1, a timing diagram for a dual dependent VCT system is shown. Waveform 10 depicts a sensed crank signal having 4 pulses per revolution. One sensed crank pulse corresponds to two sensed cam teeth signals. Therefore, 4 crank teeth correspond to 8 cam teeth.

Waveform 12 depicts a sensed exhaust cam signal having 8 pulses per revolution. The first exhaust cam tooth falling edge lags or retards 15 in relation to the falling edge of the first crank tooth.

Waveform 14 depicts a sensed dependent intake cam signal having 8 pulses per revolution. Because of the dependency, the first intake cam tooth falling edge lags or retards 15 in relation to the falling edge of the first exhaust cam tooth. At the same time, the first intake cam tooth falling edge lags or retards 30 in relation to the falling edge of the first crank tooth. In other words, because of the dual cam structure, increased time lag occurs for intake cam. As can be appreciated, the prior art approach for a single cam system of 90 limit is further restricted. Therefore, the present invention formulates a novel formula incorporating novel features and elements is provided to address the above limited restriction.

At this juncture, total time lag is still within the 90 limit. The following two waveforms shows the relationships between waveforms when the time lag or retardation exceeds the limit.

Waveform 16 depicts an identical sensed exhaust cam signal having 8 pulses per revolution in waveform 12. The first exhaust cam tooth falling edge lags or retards 75 in relation to the falling edge of the first crank tooth. Waveform 18 depicts an identical sensed dependent intake cam signal having 8 pulses per revolution. Because of the dependency, the first intake cam tooth falling edge lags or retards 70 in relation to the falling edge of the first exhaust cam tooth. At the same time, the first intake cam tooth 20 falling edge lags or retards 145 in relation to the falling edge of the first crank tooth.

Figure 2:
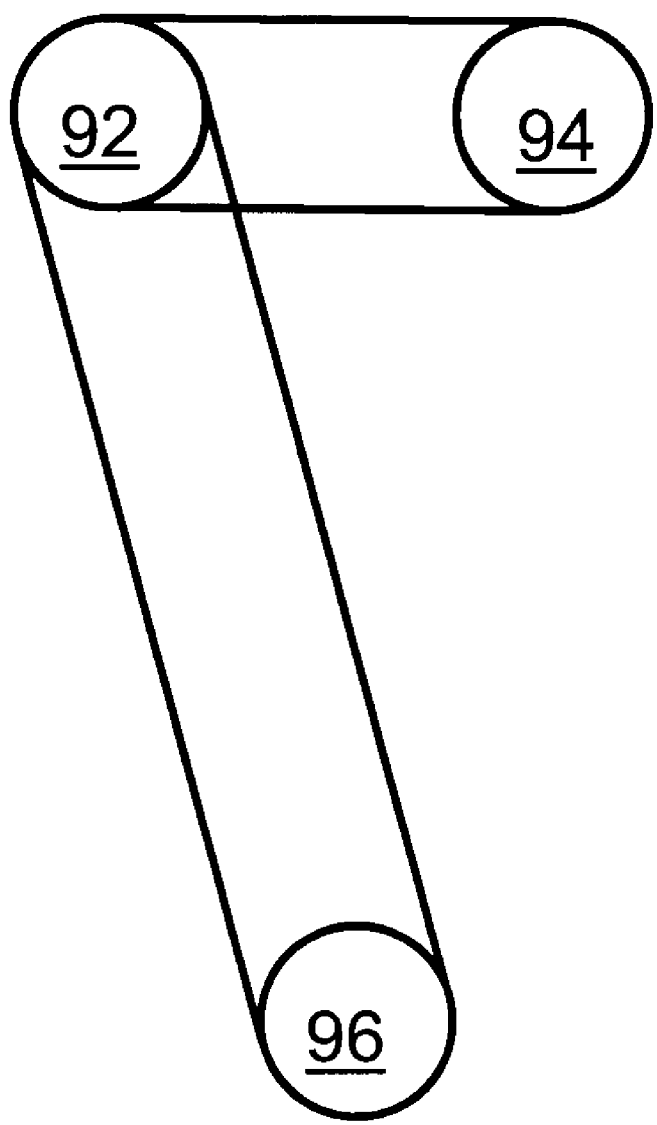
FIG. 2 shows coupling relationships between intake cam, exhaust cam, and crank shafts.

Referring to FIG. 2, in a V configuration engine with dependent intake cam shafts 90 is provided. The exhaust camshaft 92 drives the intake camshaft 94 and so an intake cam position is dependent upon the exhaust cam position. The driving force for the exhaust cam shaft 92 comes from crank shaft 96. Because of the dependency, a different method to determine the phase of the intake cams is required.

A pair of dependent VCT subsystems exists in the present invention. They are a first VCT subsystem and a second VCT subsystem respectively. The first VCT subsystem includes at least one exhaust phaser (not shown) for adjusting the angular relationship with crank shaft 96. The second VCT subsystem includes at least one intake phaser (also not shown) for adjusting the angular relationship with crank shaft 96 as well as the angular relationship with its related exhaust cam shaft. As can be appreciated, the intake cam shaft 94 not only is coupled to the crank shaft 96, but also is coupled to the exhaust cam shaft 92. Therefore, the pair of VCT subsystems is dependent in this aspect. Coupling means are provided for coupling exhaust cam shaft 92 with crank shaft 96, and coupling exhaust cam shaft 92 with intake cam shaft 94. The coupling means can be engine timing chains, timing belt, and gear drive, etc.

Figure 3:
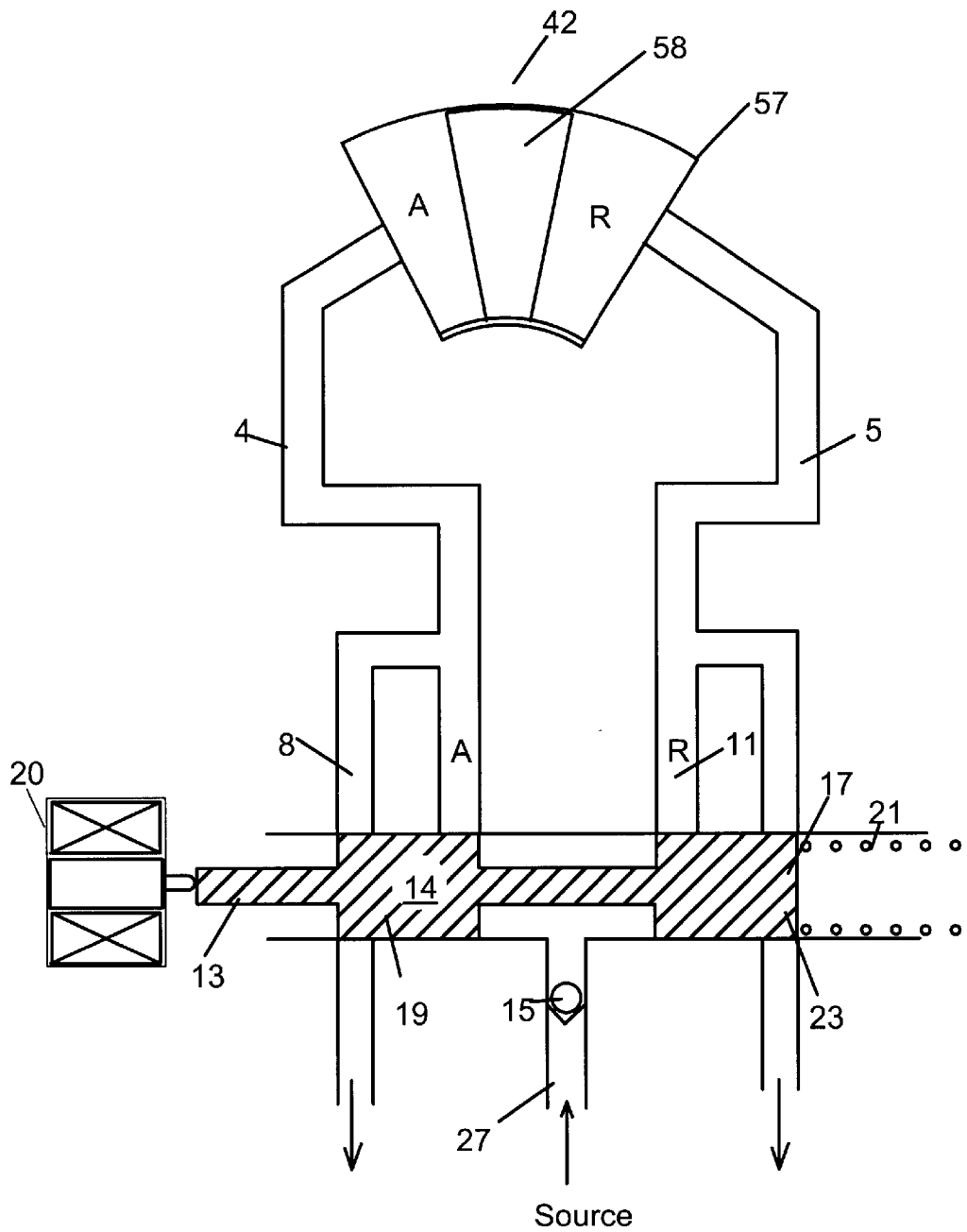
FIG. 3 shows an exemplified version of a phaser that may be applied to the present invention.

The phaser described in FIG. 2 may be any type of phaser that adjusts the angular relationship of two rotating shafts with the phaser disposed in-between. FIG. 3 shows an exemplified version of a phaser that may be applied to the present invention.

Referring to FIG. 3, a schematic depicting one type of phaser is shown. The phaser is at null position. Solenoid 20 engages spool valve 14 by exerting a first force upon the same on a first end 13. The first force is met by a force of equal strength exerted by spring 21 upon a second end 17 of spool valve 14 thereby maintaining the null position. The spool valve 14 includes a first block 19 and a second block 23 each of which blocks fluid flow respectively.

The phaser 42 includes a vane 58, a housing 57 using the vane 58 to delimit an advance chamber A and a retard chamber R therein. Typically, the housing and the vane 58 are coupled to crank shaft (not shown) and cam shaft (also not shown) respectively. Vane 58 is permitted to move relative to the phaser housing by adjusting the fluid quantity of advance and retard chambers A and R. If it is desirous to move vane 58 toward the advance side, solenoid 20 pushes spool valve 14 further right from the original null position such that liquid in chamber A drains out along duct 4 through duct 8. The fluid further flows or is in fluid communication with an outside sink (not shown) by means of having block 19 sliding further right to allow said fluid communication to occur. Simultaneously, fluid from a source passes through duct 27 and is in one-way fluid communication with duct 11 by means of one-way valve 15, thereby supplying fluid to chamber R via duct 5. This can occur because block 23 moves further right causing the above one-way fluid communication to occur. When the desired vane position is reached, the spool valve is commanded to move back left to its null position, thereby maintaining a new phase relationship of the crank and cam shaft.

The following are terms and concepts relating to the present invention.

It is noted the hydraulic fluid or fluid referred to supra are actuating fluids. Actuating fluid is the fluid which moves the vanes in a vane phaser. Typically the actuating fluid includes engine oil, but could be separate hydraulic fluid. The VCT system of the present invention may be a Cam Torque Actuated (CTA) VCT system in which a VCT system that uses torque reversals in camshaft caused by the forces of opening and closing engine valves to move the vane. The control valve in a CTA system allows fluid flow from advance chamber to retard chamber, allowing vane to move, or stops flow, locking vane in position. The CTA phaser may also have oil input to make up for losses due to leakage, but does not use engine oil pressure to move phaser. Vane is a radial element actuating fluid acts upon, housed in chamber. A vane phaser is a phaser which is actuated by vanes moving in chambers.

There may be one or more camshaft per engine. The camshaft may be driven by a belt or chain or gears or another camshaft. Lobes may exist on camshaft to push on valves. In a multiple camshaft engine, most often has one shaft for exhaust valves, one shaft for intake valves. A "V" type engine usually has two camshafts (one for each bank) or four (intake and exhaust for each bank).

Chamber is defined as a space within which vane rotates. Chamber may be divided into advance chamber (makes valves open sooner relative to crankshaft) and retard chamber (makes valves open later relative to crankshaft). Check valve is defined as a valve which permits fluid flow in only one direction. A closed loop is defined as a control system which changes one characteristic in response to another, then checks to see if the change was made correctly and adjusts the action to achieve the desired result (e.g. moves a valve to change phaser position in response to a command from the ECU, then checks the actual phaser position and moves valve again to correct position). Control valve is a valve which controls flow of fluid to phaser. The control valve may exist within the phaser in CTA system. Control valve may be actuated by oil pressure or solenoid. Crankshaft takes power from pistons and drives transmission and camshaft. Spool valve is defined as the control valve of spool type. Typically the spool rides in bore, connects one passage to another. Most often the spool is most often located on center axis of rotor of a phaser.

Differential Pressure Control System (DPCS) is a system for moving a spool valve, which uses actuating fluid pressure on each end of the spool. One end of the spool is larger than the other, and fluid on that end is controlled (usually by a Pulse Width Modulated (PWM) valve on the oil pressure), full supply pressure is supplied to the other end of the spool (hence differential pressure). Valve Control Unit (VCU) is a control circuitry for controlling the VCT system. Typically the VCU acts in response to commands from ECU.

Driven shaft is any shaft which receives power (in VCT, most often camshaft). Driving shaft is any shaft which supplies power (in VCT, most often crankshaft, but could drive one camshaft from another camshaft). ECU is Engine Control Unit that is the car's computer. Engine Oil is the oil used to lubricate engine, pressure can be tapped to actuate phaser through control valve.

Housing is defined as the outer part of phaser with chambers. The outside of housing can be pulley (for timing belt), sprocket (for timing chain) or gear (for timing gear). Hydraulic fluid is any special kind of oil used in hydraulic cylinders, similar to brake fluid or power steering fluid. Hydraulic fluid is not necessarily the same as engine oil. Typically the present invention uses "actuating fluid". Lock pin is disposed to lock a phaser in position. Usually lock pin is used when oil pressure is too low to hold phaser, as during engine start or shutdown.

Oil Pressure Actuated (OPA) VCT system uses a conventional phaser, where engine oil pressure is applied to one side of the vane or the other to move the vane.

Open loop is used in a control system which changes one characteristic in response to another (say, moves a valve in response to a command from the ECU) without feedback to confirm the action.

Phase is defined as the relative angular position of camshaft and crankshaft (or camshaft and another camshaft, if phaser is driven by another cam). A phaser is defined as the entire part which mounts to cam. The phaser is typically made up of rotor and housing and possibly spool valve and check valves. A piston phaser is a phaser actuated by pistons in cylinders of an internal combustion engine. Rotor is the inner part of the phaser, which is attached to a cam shaft.

Pulse-width Modulation (PWM) provides a varying force or pressure by changing the timing of on/off pulses of current or fluid pressure. Solenoid is an electrical actuator which uses electrical current flowing in coil to move a mechanical arm. Variable force solenoid (VFS) is a solenoid whose actuating force can be varied, usually by PWM of supply current. VFS is opposed to an on/off (all or nothing) solenoid.

Sprocket is a member used with chains such as engine timing chains. Timing is defined as the relationship between the time a piston reaches a defined position (usually top dead center (TDC)) and the time something else happens. For example, in VCT or VVT systems, timing usually relates to when a valve opens or closes. Ignition timing relates to when the spark plug fires.

Torsion Assist (TA) or Torque Assisted phaser is a variation on the OPA phaser, which adds a check valve in the oil supply line (i.e. a single check valve embodiment) or a check valve in the supply line to each chamber (i.e. two check valve embodiment). The check valve blocks oil pressure pulses due to torque reversals from propagating back into the oil system, and stop the vane from moving backward due to torque reversals. In the TA system, motion of the vane due to forward torque effects is permitted; hence the expression "torsion assist" is used. Graph of vane movement is step function.

VCT system includes a phaser, control valve(s), control valve actuator(s) and control circuitry. Variable Cam Timing (VCT) is a process, not a thing, that refers to controlling and/or varying the angular relationship (phase) between one or more camshafts, which drive the engine's intake and/or exhaust valves. The angular relationship also includes phase relationship between cam and the crankshafts, in which the crank shaft is connected to the pistons.

Variable Valve Timing (VVT) is any process which changes the valve timing. VVT could be associated with VCT, or could be achieved by varying the shape of the cam or the relationship of cam lobes to cam or valve actuators to cam or valves, or by individually controlling the valves themselves using electrical or hydraulic actuators. In other words, all VCT is VVT, but not all VVT is VCT.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A variable cam timing (VCT) system used in an internal combustion engine, said system having a dual dependent cam shaft configuration, wherein an intake cam position is referenced to an exhaust cam, comprising:

a sequence of crank tooth signals generated by a first position sensor;

a sequence of exhaust cam tooth signals generated by a second position sensor;

a sequence of intake cam tooth signals generated by a third position sensor;

a formula of intake phase degrees referenced to the exhaust cam phase, said formula being:

$$\text{Phase} = (\Delta T/T * \text{Crank Angle}) - \text{Zphase}$$

wherein $\Delta T$ is the time segment starting from a falling edge of said exhaust cam tooth signal to the next occurring falling edge of said intake cam tooth signal.

2. The system of claim 1, wherein Zphase is a run time calculated offset value.

3. The system of claim 1, wherein said internal combustion engine is a dual dependent V engine.

4. The system of claim 1, wherein T is the time between 2 applicable consecutive crank teeth falling edge signals, said T is always greater than $\Delta T$.

5. The system of claim 1, wherein Crank Angle equals 360 degrees divided by the number of evenly spaced crank teeth associated with a rolling crank shaft.

6. The system of claims 1 further comprising a controller for controlling the elements listed in claim 1.

7. In a variable cam timing (VCT) system used in an internal combustion engine, said system having a dual dependent cam shaft configuration, wherein an intake cam position is referenced to an exhaust cam, a method comprising the steps of:

providing a sequence of crank tooth signals generated by a first position sensor;

providing a sequence of exhaust cam tooth signals generated by a second position sensor;

providing a sequence of intake cam tooth signals generated by a third position sensor;

providing a formula of intake phase degrees referenced to the exhaust cam phase, said formula being:

$$\text{Phase} = (\Delta T/T * \text{Crank Angle}) - \text{Zphase}$$

wherein $\Delta T$ is the time segment starting from a falling edge of said exhaust cam tooth signal to the next occurring falling edge of said intake cam tooth signal.

* * * * *